(12) United States Patent
Haraburda et al.

(10) Patent No.: US 6,516,280 B2
(45) Date of Patent: Feb. 4, 2003

(54) METHOD AND SYSTEM FOR ELECTRONIC RECYCLE INVENTORY TRACKING

(75) Inventors: Scott S. Haraburda, Clinton, IN (US); Rex E. Masterson, Evansville, IN (US); Angelika H. Clark, Mt. Vernon, IN (US); Michael S. Davis, Mt. Vernon, IN (US); Timothy R. Klein, Evansville, IN (US); George E. McCarty, Mt. Vernon, IN (US)

(73) Assignee: General Electric Company, Pittsfield, MA (US)

( * ) Notice: Subject to any disclaimer, the term of this patent is extended or adjusted under 35 U.S.C. 154(b) by 119 days.

(21) Appl. No.: 09/745,109

(22) Filed: Dec. 20, 2000

(65) Prior Publication Data

US 2002/0077761 A1 Jun. 20, 2002

(51) Int. Cl.⁷ .............................................. G01N 37/00
(52) U.S. Cl. ....................................................... 702/82
(58) Field of Search ...................... 702/81–84; 364/468, 364/469, 474; 705/26; 29/407

(56) References Cited

U.S. PATENT DOCUMENTS

| | | | | | |
|---|---|---|---|---|---|
| 4,142,237 A | * | 2/1979 | Yamasaki | ................... | 364/469 |
| 5,005,277 A | * | 4/1991 | Uemura et al. | ............... | 29/407 |
| 5,088,045 A | * | 2/1992 | Shimanaka et al. | ......... | 364/468 |
| 5,442,561 A | | 8/1995 | Yoshizawa et al. | | |
| 5,461,570 A | * | 10/1995 | Wang et al. | ................ | 364/468 |
| 5,586,038 A | | 12/1996 | Nagaoka | | |
| 5,787,002 A | * | 7/1998 | Iwamoto et al. | ....... | 364/468.22 |
| 5,841,657 A | | 11/1998 | Hoshino et al. | | |
| 5,853,244 A | * | 12/1998 | Hoff et al. | | |
| 5,877,961 A | * | 3/1999 | Moore | ................... | 364/474.22 |
| 5,950,149 A | * | 9/1999 | Fieramosca et al. | ......... | 702/183 |
| 6,027,022 A | * | 2/2000 | Hong et al. | ............ | 235/462.01 |
| 6,036,087 A | * | 3/2000 | Hong et al. | ................. | 235/375 |
| 6,141,598 A | * | 10/2000 | Nam | ........................... | 700/95 |
| 6,163,761 A | * | 12/2000 | Kent | ........................... | 702/187 |
| 6,205,060 B1 | * | 3/2001 | Sanda et al. | ........... | 365/189.04 |
| 6,314,328 B1 | * | 11/2001 | Powell | ........................ | 700/80 |
| 2001/0011232 A1 | * | 8/2001 | Peterson et al. | .............. | 705/26 |

FOREIGN PATENT DOCUMENTS

CA          2280414      *   8/1999     ........... B62D/65/00

* cited by examiner

*Primary Examiner*—John Barlow
*Assistant Examiner*—Aditya Bhat

(57) ABSTRACT

An exemplary embodiment is a method and system for electronic recycle inventory tracking corresponding to a product on a production line. The system includes a processor integrated with the production line for identifying the product, determining whether the product is rejected, assigning a first destination to the product if the product is not rejected and generating tracking data based on the first destination, determining whether the product is to be recycled based on determining whether the product is rejected and assigning a second destination to the product based on said determining whether the product is to be recycled and generating tracking data based on the second destination. A network is connected to the processor, and a user system is coupled to the network. A database is coupled to the processor for storing data relating to the product.

22 Claims, 4 Drawing Sheets

FIG. 1

METHOD AND SYSTEM FOR ELECTRONIC RECYCLE INVENTORY TRACKING

BACKGROUND

The invention relates generally to production line management, and more specifically, to a method and system for electronic recycle inventory tracking.

Many production lines, such as in the plastics industries, involve numerous processes to create an end product. In production lines where intricate or otherwise information-sensitive manufacturing is performed, correctly transferring critical production information is essential. Any number of factors may be significant to the proper running of the production line at any given time, but without the efficient, fast and accurate transfer of this information, numerous errors may occur.

For example, in the finishing of plastic pellets (which have been produced previously in a resin process), the finishing process encompasses adding various materials to the pellets. The added materials may be flameretardants, pigment, glass, etc., depending on the final use thereof. After the addition, or what is typically called the compounding process, the pellets are extruded into an end product.

For various reasons, the end product may not be acceptable for customer use. Nevertheless, the product may be acceptable for recycling. For many manufacturers, recycling products creates an economic and environmental benefit. Typically, 10% of a production uses recycle products. Usually, a recycle product may be used in a similar manner as raw material. However, recycle products are different from raw materials in that a recycle product carries with it a past or history. For example, a recycle product's history may include the composition of the product, such as its raw material(s) and quantity, along with the manufacturing processes used to make the recycle product. Typically, recycle products are inventoried and tracked using cumbersome manual techniques, such as spreadsheets. Due to potential human error with manual techniques, discrepant and questionable products may get recycled. Therefore, inventorying and tracking a recycle product can be a logistical nightmare and difficult to manage. However, accurately tracking the recycle product is important.

Thus, there is a need for a more efficient, fast and accurate method and system for tracking recycle inventory.

SUMMARY

An exemplary embodiment is a method and system for electronic recycle inventory tracking corresponding to a product on a production line. The system includes a processor integrated with the production line for identifying the product, determining whether the product is rejected, assigning a first destination to the product if the product is not rejected and generating tracking data based on the first destination, determining whether the product is to be recycled based on determining whether the product is rejected and assigning a second destination to the product based on said determining whether the product is to be recycled and generating tracking data based on the second destination. A network is connected to the processor, and a user system is coupled to the network. A database is coupled to the processor for storing data relating to the product.

BRIEF DESCRIPTION OF THE DRAWINGS

Referring now to the drawings wherein like elements are numbered alike in several FIGURES:

FIG. 1 depicts an exemplary electronic production run sheet in an embodiment of the invention.

DETAILED DESCRIPTION

Figure 2:
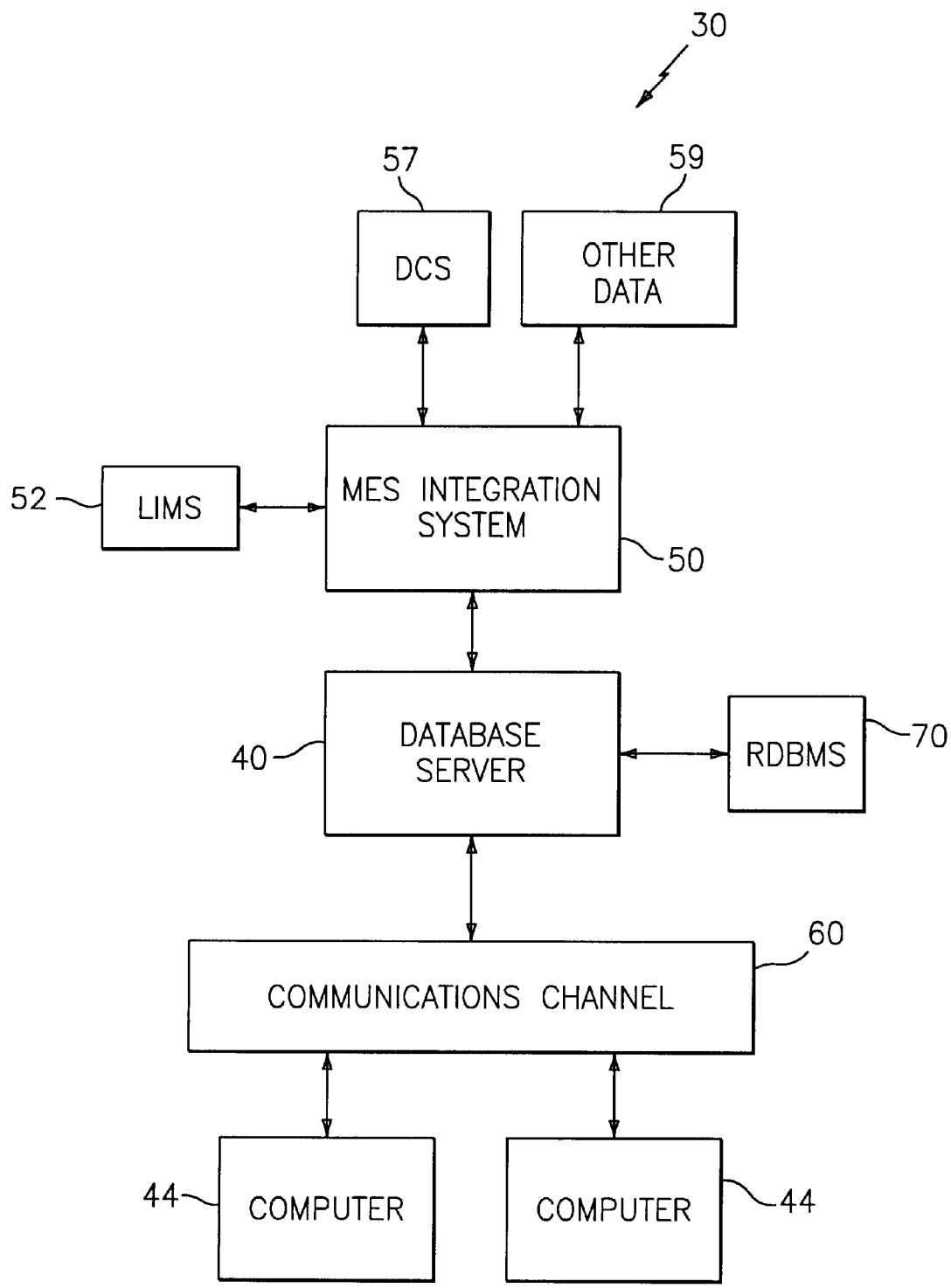
FIG. 2 is a block diagram of a computer system in an embodiment of the invention.

This application relates generally to commonly owned and invented U.S. application Ser. No. 09/498,035, filed Feb. 4, 2000, entitled "Method and System for Electronically Capturing, Storing, Searching and Retrieving Production Data," the teachings of which are incorporated by reference herein.

The electronic recycle inventory tracking method and system involves the tracking of a discrepant product made by the manufacturing process, but which may be recycled for use in another product. The system eliminates many problems associated with manual tracking techniques, and increases reliability in the management of recycle products. Recycle products may include both rejected end products (products that have completed the manufacturing process) and rejected products that are removed from the production process during production for various reasons, such as failure to meet specification or quality control requirements. As previously discussed, current manual tracking techniques are cumbersome, costly and ripe for error.

For instance, manual data entry errors are common, and can lead to inaccuracies in the tracking data. These inaccuracies can lead to production errors and cause costly storage and maintenance problems. Thus, accurate information regarding a recycle product's location and physical properties lowers production costs and maintains quality control requirements.

The rejection information associated with a product is typically manually entered to a run sheet when the product is rejected. However, the manual run sheet may not include data specifying that the product is recyclable. In contrast, the invention does not require such manual entry, and as discussed, the errors and problems associated with manual entry of information are eliminated. The product may be automatically coded as a recycle product, inventoried and tracked for later use. Plus, accurate historical analysis of the recycle product is readily available from the information contained in an electronic production run sheet 80. Additionally, rejection data may be included in the electronic production run sheet 80. This helps to improve the analysis of the recycle product (such as providing useful information for determining the root cause of a problem) and optimize the production process through improved tracking of the identity, location, quantity and physical properties of the recycle product.

Figure 1:
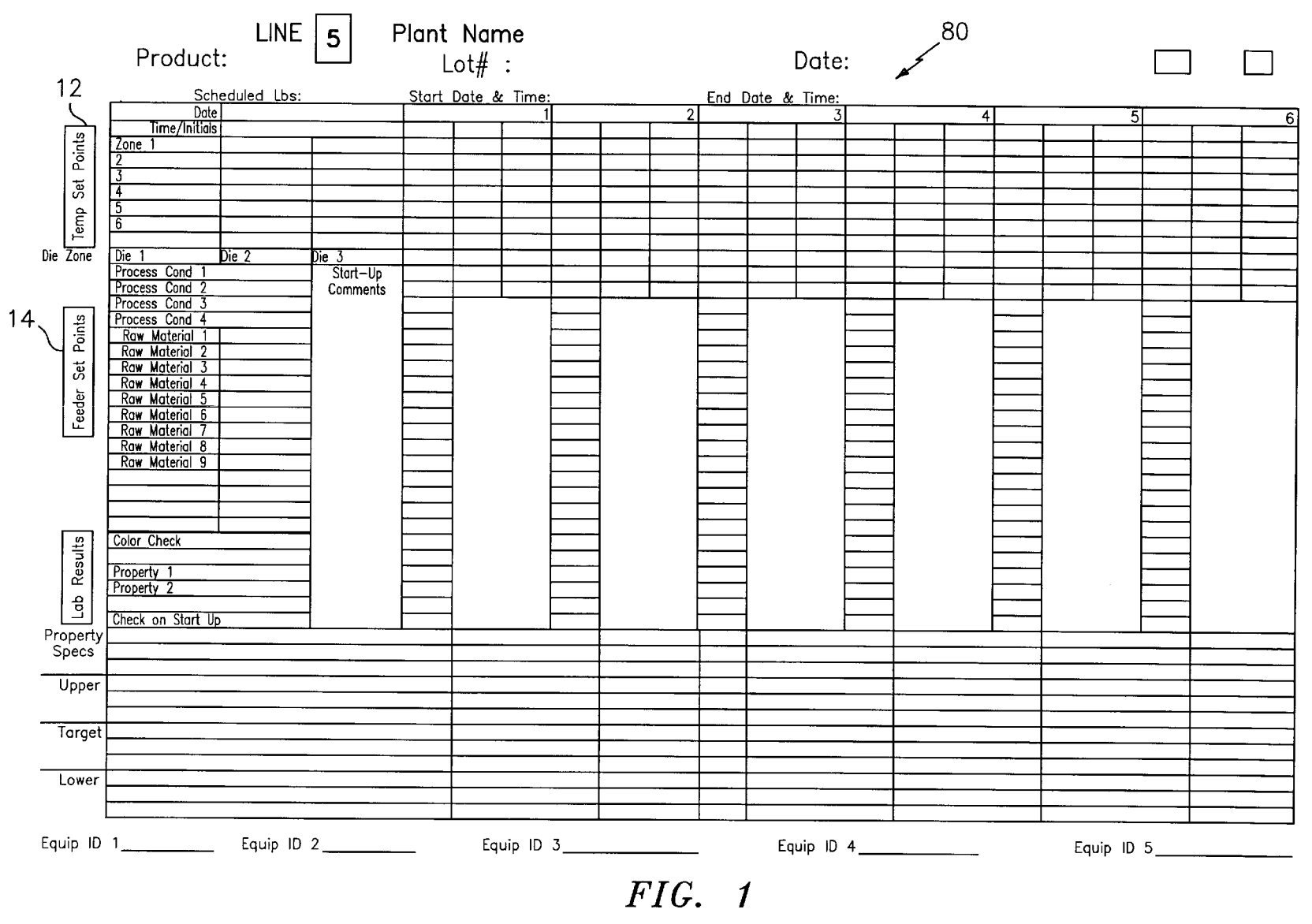

In general, as discussed, an embodiment may include an electronic production run sheet 80, FIG. 1, containing production readings and other data for a particular production line product. The manual version of a run sheet is usually in a tabular form with various columns in which the operator must record the production information by hand. After recording the product and lot number, date and time, the operator must hand write the temperature set points at 12 for the various zones of the extruder. The operator must also record various feeder set points 14.

Although the system of an embodiment is described with relation to plastics finishing, it should be appreciated that the system and method described herein can be applied to various other manufacturing and data retrieval and storage environments.

An embodiment utilizes a manufacturing execution system (MES) computer system 30. Referring to FIG. 2, the computer architecture of the MES computer system 30 will be described. The MES computer system 30 includes a database server 40 and computers 44. Although only two computers 44 are shown for simplicity it should be appreciated that a plurality of computers can be located at different locations in the production site for use by a plurality of operators. Moreover the database server 40 can be identical to computer 44 and is distinguishable as an embodiment only in that server 40 is the primary data storage source with which data stored in computers 44 can be synchronized therewith.

Computer(s) 44 are coupled to the database server 40 by communications channel 60. Communications channel 60 can be a network, such as a wide area network (WAN), local area network (LAN), Ethernet, intranet, a direct cable connection, a connection via phone lines and modems, or the like. Further, communications channel 60 can be continuous or intermittent and can be any mechanism for providing the communications described below. For example, communications channel 60 can include removable media, such as a diskette. Data can be sent over communications channel 60 in any appropriate format, such as e-mail in simple mail transfer protocol (SMTP), as attachments to email, as ASCII or binary files using file transfer protocol (FTP), or the like.

Even further, communications channel 60 can be the Internet. In such an embodiment, computer(s) 44 execute a user application (e.g., web browser) for interacting with the database server 40. Communication with computer(s) 44 can be achieved in any manner consistent with Internet information transfer, including but not limited to, HTTP and FTP, or a client/server connection.

Likewise, system components may be located remotely from each other and coupled via communications channel 60. For example, the database server 40 may be located off-site of the production line and communicates with corresponding components via communications channel 60 as a network, such as the Internet, WAN, LAN, Ethernet, intranet, a direct cable connection, a connection via phone lines and modems, or the like. Such remote locating is useful if, for example, the production facility environment is too extreme for the components.

The database server 40 is managed by a relational database management system (RDBMS) 70, such as the ORACLE RELATIONAL DATABASE MANAGEMENT SYSTEM by Oracle Corporation of Redwood Shores, Calif. RDBMS 70 manages a relational database to store the data. The data records, data tables, and data relationships contained in the database managed by RDBMS 70 enable the MES computer system 30 to provide increased reliability in searching and analyzing quality assurance (QA) lab testing data.

In the MES computer system 30, the database server 40 is a computer having sufficient resources to support RDBMS 70. Moreover, the database server 40 supports multi-operator access to RDBMS 70 over a computer network. Each operator computer terminal 44 should be sufficient to support an operating system such as WINDOWS 98, UNIX or other similar operating systems. These systems are used for communication with the Laboratory Information Management System (LIMS) 52, which executes on computers 44, as well.

As discussed, computers 44 execute application programs, which communicate with RDBMS 70 to query the databases managed by RDBMS 70 and to provide data for that database. The LIMS database 52 in this process involves the display and storage of the lab tests, along with the required specifications, and is another source of production data, such as the test results of the product properties. The data captured by the LIMS is displayed using SQC graphs to indicate quality of the product and/or process. The data can be captured each time a QA lab test occurs (or at other convenient times), also known as a production line check.

The MES computer system 30 includes a variety of features. Data exchange between the database server 40 and the different databases, such as LIMS 52, can occur due to the use of the MES integration system 50. This acts as an interface between the database server 40 and LIMS 52, programmable logic controller (PLC) interface 56 with data, such as recycle product location and tracking via another production data database 59. Data exchange also occurs due to the use of a compliant language such as VISUAL BASIC (VB) from Microsoft Corporation of Redmond, Washington. If necessary, functionality modules can be used to group the production data by batches or lots.

The VB application programming interface (API) program also allows the operator to retrieve the production run data in the snap shot format by entering the line number, product number or date in the appropriate windows of the electronic production run sheet 80 screen. The line number and product number are pull-down menus that the operators can select. The date is a manual entry block. Each of these allows the operator to search the database system for historical batches (or lots). Because there are several thousand lots made each year, this makes it easier for data retrieval.

The VB API program also allows the operator to print a hard copy of the electronic production run sheet 80 and to print a pre-configured report for the production run. This will retrieve the appropriate batch (or lot) production and QA lab test data for printout on the pre-configured report format, similar to the one displayed in FIG. 1.

The database server 40 acts as a universal user interface due to RDMS 70, EDCP RDBMS, VB API access. Furthermore, utilizing standard technology and tool sets such as VB, structured query languages (SQL), object linking and embedding (OLE) for process control, open database connectors (ODBC) and ActiveX controls also allow for universal user interface.

Figure 3A:
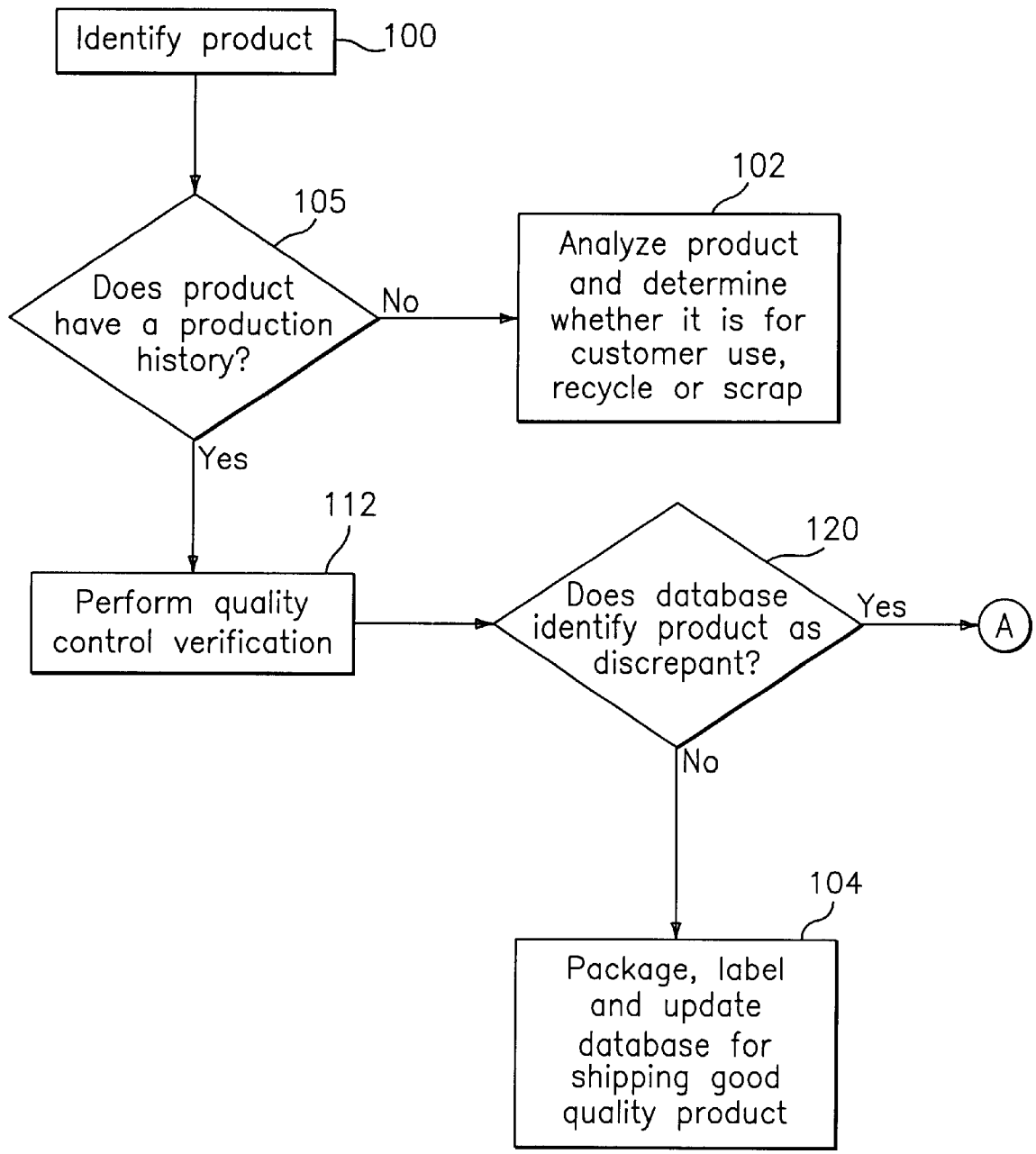
FIGS. 3A-3B illustrate an exemplary method for electronic recycle inventory tracking in an embodiment of the invention.
Figure 3B:
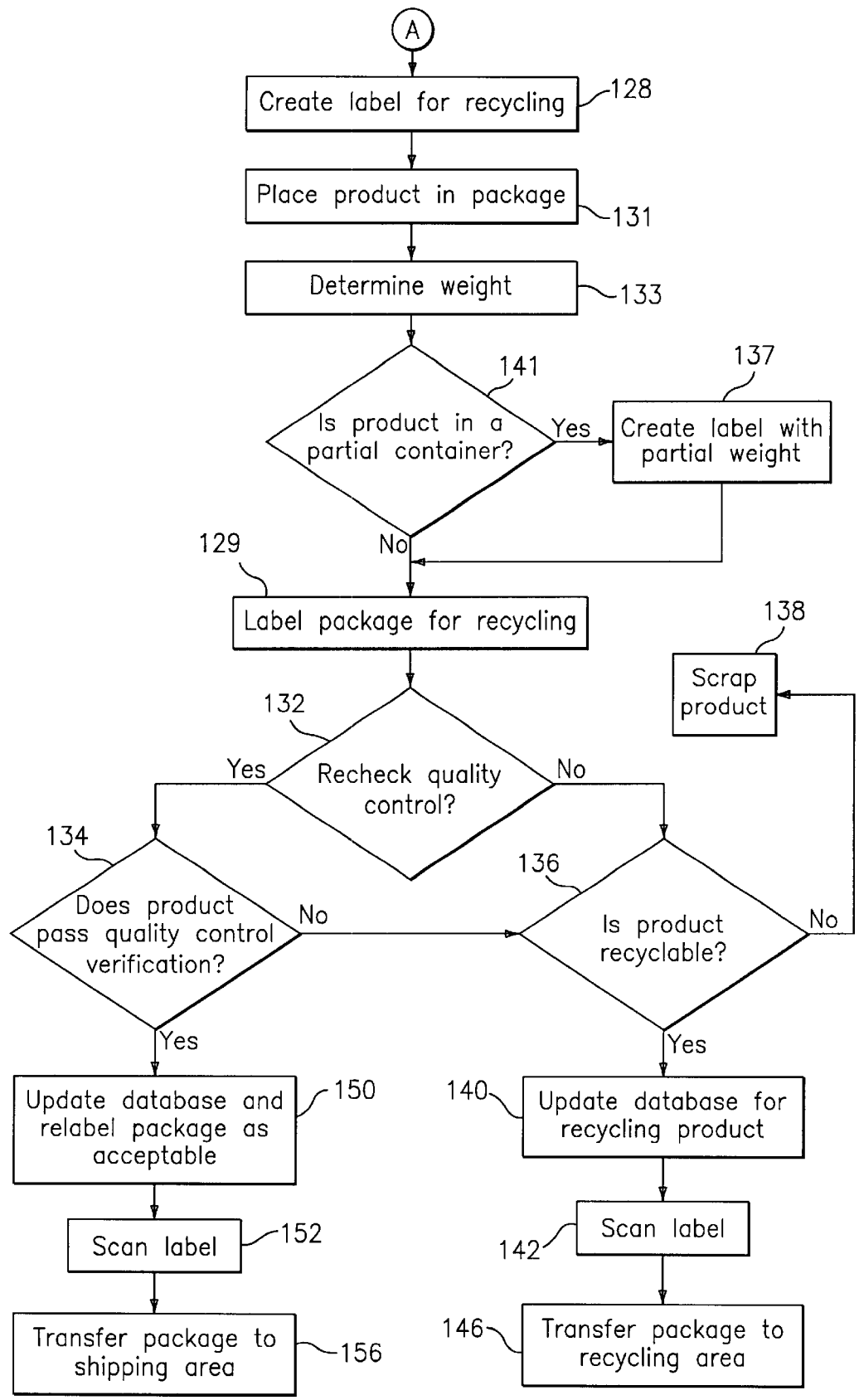

FIGS. 3A–3B illustrate an exemplary method for electronic recycle inventory tracking. The method of FIGS. 3A–3B may be implemented by an operator using one of the computer(s) 44 or even automatically based on information previously entered to the MES computer system 30. Information may be obtained several ways. For example, the information may be entered via keyed entry, voice input and/or bar-code type scanning of identification labels associated with the products. Also, as previously discussed, a rejection code for a product may be included on the electronic production run sheet 80. This information may be archived and used to improve accuracy and efficiency with recycle inventory tracking. The identity of the person entering information and designating the product for recycling may also be entered to the database. The operator's identity may be useful when determining accountability for errors. Again, the operator's identity may be obtained several ways, such as via keyed entry, voice input, bar-code type scanning of the operator's identification badge, and the identity may even be automatically entered based on information previously entered to the MES computer system 30.

First, in step 100, the product is identified. Step 105 determines whether the product has a production history.

The production history may be maintained in a database. Note that although an embodiment utilizing the production run sheet 80 for collecting data has been described, further embodiments may utilize other methods for collecting the data and archiving to a database. Although the product may be an "end product," the product may also be a "non-end product," such as a product that was removed from the production process at any point prior to finishing the production process. If the product has no production history, in step 102, the product is analyzed and a first destination, second destination or a third destination is determined (e.g., for recycle, scrap or customer use). However, if step 105 determines that the product has a production history, then in step 112, a quality control verification is performed. Of course, quality control verification is a function of the product and its end use. Numerous techniques may be utilized to determine whether a product meets a manufacturer's quality requirements. Next, step 120 determines whether the product is identified as a discrepant product. If the product is not identified as a discrepant product, then, in step 104, the product is packaged, labeled and the database is updated to indicate that the product is good and ready for shipping.

If, in step 120, the database identifies the product as discrepant, a label designating the product for recycling is created in step 128. Next, in step 131, the product is placed in a package and its weight is determined in step 133. Step 141 determines whether the product is in a partial container. If so, then in step 137, a label with the partial weight is created and scanned. If the product is not in a partial container, in step 129, the package is labeled for recycling. In step 132, quality control is verified again (rechecked). Step 134 determines whether the product passes the quality control verification. If not, step 136 determines whether the product is recyclable. If not, the product is scrapped in step 138. If the product is recyclable, in step 140, the database is updated. In step 142, the label is scanned, and in step 146, the package is transferred to a recycling area. If, in step 134, the product passes quality control verification, then in step 150, the database is updated and the package is relabeled as acceptable. In step 152, the label is scanned. In step 156, the package is transferred to the shipping area.

As a result, the information collected and archived for each recycle product is easily accessed and managed using the method and system for electronic recycle inventory tracking. The method and system may be used to help plan future production by quickly and accurately determining which recycle products are available for use. Once a recycle product is used in a future production, the database is updated to reflect the change in recycle inventory.

The description applying the above embodiments is merely illustrative. As described above, embodiments in the form of computer-implemented processes and apparatuses for practicing those processes may be included. Also included may be embodiments in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Also included may be embodiments in the form of computer program code, for example, whether stored in a storage medium, loaded into and/or executed by a computer, or as a data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A system for electronic recycle inventory tracking corresponding to a product on a production line, the system comprising:
    a processor integrated with said production line for identifying said product, determining whether said product is rejected, assigning a first destination to said product if said product is not rejected and generating tracking data based on said first destiantion, determining whether said product is to be recycled based on said determining whether said product is rejected and assigning a second destination to said product based on said determining whether said product is to be recycled and generating tracking data based on said second destination;
    a network connected to said processor;
    a user system coupled to said network; and
    a database coupled to said processor for storing data relating to said product;
    said processor assigning a rejection code based on a reason for rejecting said product;
    wherein said assigning said rejection code includes:
        determining whether said product has a previously assigned rejection code;
        performing a quality control test if said product does not have a previously assigned rejection code;
        determining whether said product is acceptable for recycling based on a result of said quality control test; and
        coding said product to be recycled if said product is acceptable for recycling.

2. The system of claim 1, further including said processor generating an electronic production run sheet including said rejection code.

3. The system of claim 1, further including said processor coding said product to be scrapped if said product is not acceptable for recycling.

4. The system of claim 1, wherein said determining whether said product is rejected includes:
    determining whether said product completed production; and
    determining whether said product was removed from the production process during production if said product did not complete production.

5. The system of claim 1, wherein said determining whether said product is rejected includes determining whether said product has a production history.

6. A method for electronic recycle inventory tracking corresponding to a product on a production line, the method comprising:
    identifying said product:
    determining whether said product is rejected;
    assigning a first destination to said product if said product is not rejected and generating tracking data based on said first destination;

determining whether said product is to be recycled based on said determining whether said product is rejected;

assigning a second destination to said product based on said determining whether said product is to be recycled and generating tracking data based on said second destination;

assigning a rejection code based on a reason for rejecting said product;

wherein said assigning said rejection code includes:
 determining whether said product has a previously assigned rejection code;
 performing a quality control test if said product does not have a previously assigned rejection code;
 determining whether said product is acceptable for recycling based on a result of said quality control test; and
 coding said product to be recycled if said product is acceptable for recycling.

7. The method of claim 6, further including generating an electronic production run sheet including said rejection code.

8. The method of claim 6, further including coding said product to be scrapped if said product is not acceptable for recycling.

9. The method of claim 6, wherein said determining whether said product is rejected includes:
 determining whether said product completed production; and
 determining whether said product was removed from the production process during production if said product did not complete production.

10. The method of claim 6, wherein said determining whether said product is rejected includes determining whether said product has a production history.

11. A storage medium encoded with machine-readable computer program code for electronic recycle inventory tracking corresponding to a product on a production line, said storage medium including instructions for causing a processor to implement a method comprising:
 identifying said product;
 determining whether said product is rejected;
 assigning a first destination to said product if said product is not rejected and generating tracking data based on said first destination;
 determining whether said product is to be recycled based on said determining whether said product is rejected;
 assigning a second destination to said product based on said determining whether said product is to be recycled and generating tracking data based on said second destination; and
 assigning a rejection code based on a reason for rejecting said product;
 wherein said assigning said rejection code includes instructions for causing said processor to implement:
  determining whether said product has a previously assigned rejection code;
  performing a quality control test if said product does not have a previously assigned rejection code;
  determining whether said product is acceptable for recycling based on a result of said quality control test; and
  coding said product to be recycled if said product is acceptable for recycling.

12. The storage medium of claim 11, further including instructions for causing said processor to implement generating an electronic production run sheet including said rejection code.

13. The storage medium of claim 11, further including instructions for causing said processor to implement coding said product to be scrapped if said product is not acceptable for recycling.

14. The storage medium of claim 13, wherein said determining whether said product is rejected includes instructions for causing said processor to implement:
 determining whether said product completed production; and
 determining whether said product was removed from the production process during production if said product did not complete production.

15. The storage medium of claim 11, wherein said determining whether said product is rejected includes instructions for causing said processor to implement determining whether said product has a production history.

16. A computer data signal for electronic recycle inventory tracking corresponding to a product on a production line, said computer data signal comprising code configured to cause a processor to implement a method comprising:
 identifying said product;
 determining whether said product is rejected;
 assigning a first destination to said product if said product is not rejected and generating tracking data based on said first destination;
 determining whether said product is to be recycled based on said determining whether said product is rejected;
 assigning a second destination to said product based on said determining whether said product is to be recycled and generating tracking data based on said second destination; and
 assigning a rejection code based on a reason for rejecting said product;
 wherein said assigning said rejection code includes code configured to cause said processor to implement:
  determining whether said product has a previously assigned rejection code;
  performing a quality control test if said product did not have a previously assigned rejection code;
  determining whether said product is acceptable for recycling based on a result of said quality control test; and
  coding said product to be recycled if said product is acceptable for recycling.

17. The computer data signal of claim 16, wherein said computer data signal is embodied in a carrier wave.

18. The computer data signal of claim 16, wherein said computer data signal is unmodulated.

19. The computer data signal of claim 16, further including code configured to cause said processor to implement generating an electronic production run sheet including said rejection code.

20. The computer data signal of claim 16, further including code configured to cause said processor to implement coding said product to be scrapped if said product is not acceptable for recycling.

21. The computer data signal of claim 16, wherein said determining whether said product is rejected includes code configured to cause said processor to implement:
 determining whether said product completed production; and
 determining whether said product was removed from the production process during production if said product did not complete production.

22. The computer data signal of claim 16, wherein said determining whether said product is rejected includes code configured to cause said processor to implement determining whether said product has a production history.

* * * * *